United States Patent [19]
Garvey

[11] 3,856,351
[45] Dec. 24, 1974

[54] VEHICLE OCCUPANT RESTRAINT BELT SYSTEM WITH COMFORT CLIP

[75] Inventor: Louis P. Garvey, West Bloomfield, Mich.

[73] Assignee: General Motors Corporation, Detroit, Mich.

[22] Filed: Dec. 3, 1973

[21] Appl. No.: 421,213

[52] U.S. Cl............ 297/388, 280/150 SB, 297/389
[51] Int. Cl............................................ A62b 35/00
[58] Field of Search ..... 297/388, 389, 385; D2/407, D2/447, 405, 408, 409, 428; 24/114.5, 198, 115 H, 169, 172; 242/107.2; 280/150 SB

[56] References Cited
UNITED STATES PATENTS

| | | | |
|---|---|---|---|
| 2,465,787 | 3/1949 | Bliek | D2/477 |
| 2,495,029 | 1/1950 | Spengler | D2/409 |
| 2,637,084 | 5/1953 | Lorentzen | 24/114.5 |
| 3,531,060 | 9/1970 | Foster | 242/107.2 |
| 3,620,569 | 11/1971 | Mathis | 297/389 |
| 3,624,673 | 11/1971 | Merchant | 24/137 R |
| 3,646,644 | 3/1972 | Watts | 24/114.5 |
| 3,695,696 | 10/1972 | Lohr | 297/388 |
| 3,695,697 | 10/1972 | Stoffel | 297/389 |

FOREIGN PATENTS OR APPLICATIONS

| | | | |
|---|---|---|---|
| 1,052,232 | 12/1966 | Great Britain | 297/389 |

*Primary Examiner*—James T. McCall
*Attorney, Agent, or Firm*—J. A. Kushman

[57] ABSTRACT

An automotive vehicle occupant restraint belt system includes lap and shoulder belts with first ends connected to a common D-ring that is selectively attached to a buckle to secure the belt system in an occupant restraining position. The other end of the lap belt is received by an automatic locking type retractor and the other end of the shoulder belt is received by an inertia type locking retractor after first passing through a stop mounted on the seat back of the seat with which the belt system is associated. The retractors normally tension the belts across the occupant's lap and chest while in the restraining position. A plastic comfort clip of a one-piece construction is positioned on the shoulder belt between the D-ring and the stop and includes a rectangular base of a generally planar configuration with integral wings at each lateral end thereof that prevent the clip from moving through the seat back mounted stop. A pair of clamping portions integrally connected to the ends of the base extend about the respective edges of the shoulder belt back toward each other with generally ogee configurations that terminate short of each other so as to define a slot. An intermediate portion of the shoulder belt is inserted between the clamping portions and the base so as to be clamped by the clip. The clamping force exerted on the shoulder belt is not so large as to prevent the clip from being readily slid along the shoulder belt by a manual effort so as to allow adjustment. However, the clamping force is sufficiently large to prevent the shoulder belt retractor from pulling the shoulder belt through the clip. The clip is adjusted so that the wings thereof engage the stop and prevent the shoulder belt retractor from tensioning the shoulder belt across the occupant's chest.

2 Claims, 5 Drawing Figures

PATENTED DEC 24 1974

3,856,351

VEHICLE OCCUPANT RESTRAINT BELT SYSTEM WITH COMFORT CLIP

BACKGROUND OF THE INVENTION

This invention relates generally to restraint belt systems for use within automotive vehicles so as to restrain vehicle occupants in seated positions.

Automotive vehicle occupant restraint belt systems generally utilize restraint belts of suitable webbing material that is approximately 2 inches wide and one sixteenth of an inch thick. Prior belt restraint systems have utilized these belts across both the occupant's lap and chest so as to prevent upper torso movement in addition to movement of the lower portion of the torso. To prevent these belt systems from giving the vehicles a cluttered appearance, the ends of the belts are generally received by belt retractors so as to wind the belts within reels of the retractors when not in use. This winding thus stores the unused belts and gives the vehicle an aesthetically appealing appearance. These retractors have been of the automatic locking type so as to lock the belt against pull out upon the initial winding of the belt after being pulled from a fully stored condition. The retractors have also been of the inertia type so that the belt is locked against pull out in response to abrupt belt pulls and/or in response to abrupt vehicle accleration or deceleration. Various devices and arrangements have been utilized in vehicle occupant restraint belt systems to prevent the winding bias of the associated belt retractors from applying tension directly across the occupant's body.

SUMMARY OF THE INVENTION

This invention provides an improved automotive vehicle restraint belt system with lap and shoulder belts having ends connected to a common component of a buckle arrangement that is selectively attached to another such component so as to secure the belt system in an occupant restraining position, with an automatic locking type belt retractor receiving the other end of the lap belt so as to normally tension this belt across the occupant's lap, with an inertia locking type retractor receiving the other end of the shoulder belt so as to normally tension this belt across the occupant's chest, and with a stop through which the shoulder belt extends so as to be cooperable with a comfort clip positioned along the shoulder belt to prevent the shoulder belt retractor from tensioning the shoulder belt across the occupant's chest.

One feature of the invention is that the comfort clip is of a one-piece construction and includes a generally rectangular base with a pair of clamping portions integrally connected to the ends of the base and extending about the edges of the shoulder belt so as to terminate short of each other and allow an intermediate portion of the shoulder belt to be inserted between the clamping portions and the base, and the clamping force exerted on the shoulder belt is not so large as to prevent the clip from being readily slid along the shoulder belt by a manual effort to provide adjustment thereof but is sufficiently large to prevent the shoulder belt retractor from pulling the shoulder belt through the clip so that engagement between the clip and the stop prevents the shoulder belt retractor from tensioning the shoulder belt across the occupant's chest. Another feature of the invention is that the ends of the base which integrally support the clamping portions also have a pair of wings integrally projecting from them and these wings have inwardly extending depressions at which the clip is manually grasped, and the wings also provide the portions of the clip which engage the stop to prevent movement of the clip through the stop. Another feature of the invention is that the clamping portions have generally ogee configurations with the inner ends of these clamping portions providing the engagement with the shoulder belt that clamps the shoulder belt between the clamping portions and the base of the clip.

BRIEF DESCRIPTION OF THE DRAWINGS

The above-specified features and other features, objects and advantages of the automotive vehicle restraint belt system of this invention are readily apparent from the following detailed description of the preferred embodiment and the drawings in which.

DETAILED DESCRIPTION OF THE PREFERRED EMBODIMENT

Figure 1:
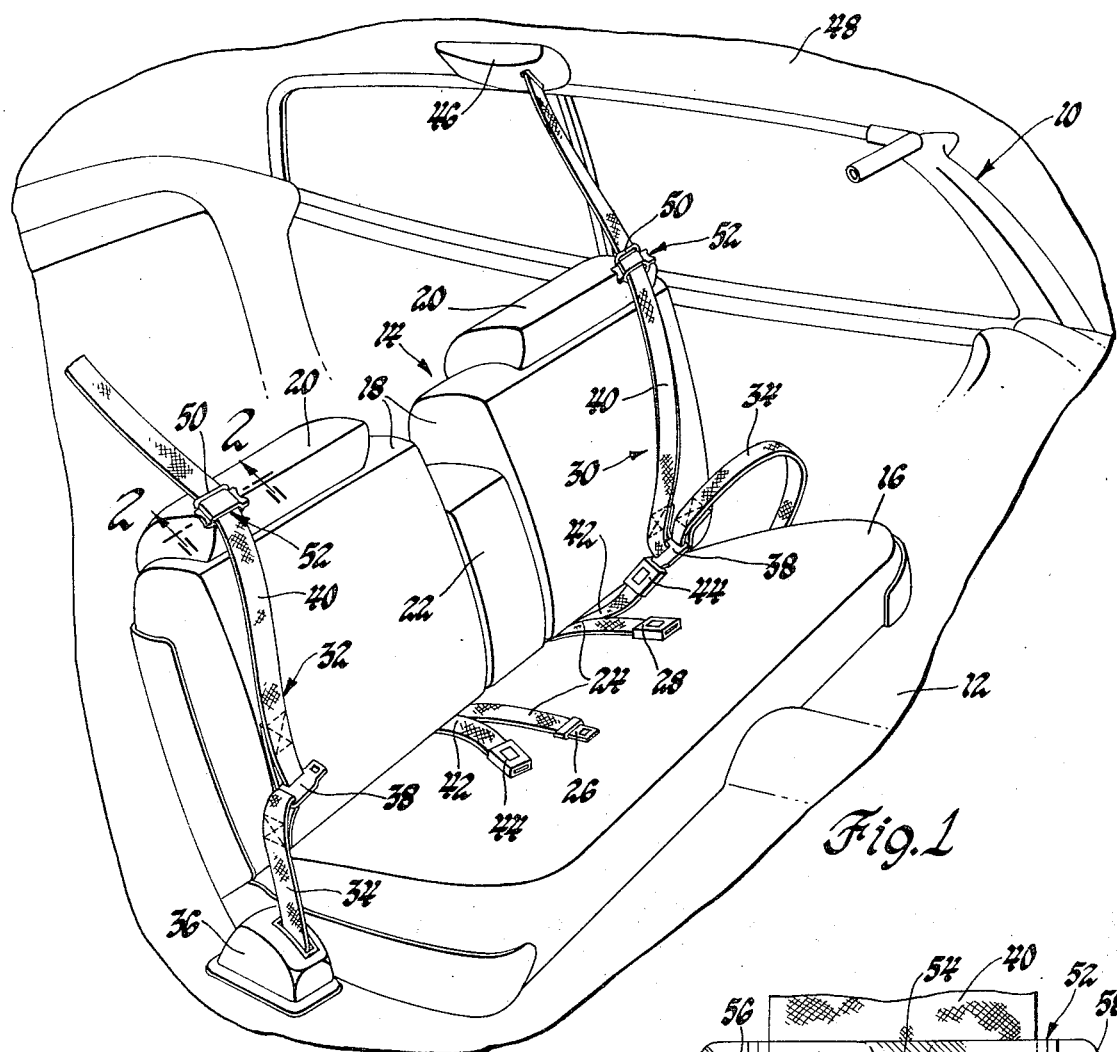
FIG. 1 is a perspective view of the interior of an automotive vehicle whose front seat utilizes a pair of restraint belt systems constructed in a manner according to this invention.

Referring generally to FIG. 1 of the drawings, the interior occupant compartment of an automotive vehicle 10 is shown as including a floor 12 which conventionally mounts a front bench type seat 14 by way of seat adjusters which are not shown. Seat 14 includes a conventional seat cushion 16 and a pair of seat backs 18 for the vehicle driver and the outboard front seat passenger. The upper ends of seat backs 18 support headrests 20 for the driver and outboard seat passenger. Between the seat backs 18, a somewhat smaller seat back 22 is positioned for use by a center passenger of the seat. This seat back 22 may also be tipped forwardly to provide a console between the driver and outboard passenger when the seat need only accommodate two occupants. When being used by three occupants, the center passenger utilizes two lap belt portions 24 whose free ends respectively attach a male D-ring 26 and a female buckle 28. The D-ring 26 is selectively attached and detached from the buckle 28 so as to selectively secure the lap belt portions 24 about the center seat passenger in a restraining position.

A pair of restraint belt systems for the driver and the outboard front seat passenger are respectively indicated by 30 and 32 and are constructed in a manner according to this invention. The restraint belt system 30 for the driver is shown positioned in an occupant restraining position while the restraint belt system 32 for the passenger is shown in a storage position. These two restraint belt systems are, however, identical to each other except for being symmetrical about a vertical plane that extends through the central portion of the vehicle between the forward and rearward vehicle ends.

The restraint belt systems 30 and 32 will now be described using like numerals for like components of each of the systems. Each belt system includes a lap belt 34 whose lower end is received by an automatic locking type retractor 36, only one shown, positioned on the vehicle floor 12 adjacent the outboard end of the vehicle seat cushion 16. This type of retractor normally pulls the lap belt 34 toward a stored position within the retractor by a spring biased belt reel and allows the lap belt to be pulled out from the retractor only from a fully wound condition. Upon the initial retracting of the lap belt from an unwound condition, the retractor automatically locks and will not allow the belt to be pulled out further until it is again fully stored within the retractor. This type of retractor is well known in the automotive vehicle occupant restraint belt art and is thus not being described herein in detail. The other end of each lap belt 34 is looped through an aperture in a male buckle component or D-ring 38 and is then stitched to itself so as to secure the lap belt to the D-ring.

Each restraint belt system 30 and 32 also includes a shoulder belt 40 whose lower end is likewise looped through an aperture in the associated D-ring 38 and stitched to itself so as to provide attachment to the D-ring. Adjacent the lap belt portions 24 for the center seat occupant, the outboard restraint belt systems 30 and 32 each include short lengths of belt 42 that pass through the juncture between the seat cushion 16 and the respective seat backs 18 so as to be secured to the vehicle floor 12 behind seat 14. The forward ends of these belts 42 attach respective buckle components or female buckles 44 that selectively receive the D-rings 38 so as to secure the restraint belt systems 30 and 32 in occupant restraining positions such as shown by the driver belt system 30. In this restraining position, the lap belts 34 extend laterally with respect to the vehicle across the users' laps while the shoulder belts 40 extend diagonally across the users' chests passing over the outboard shoulder. The upper ends of the shoulder belts 40 are received by inertia type belt retractors 46, only one shown, mounted on the outboard edges 48 of the roof above and to the rear of seat 14 at the outboard sides of the ends of the seat. These retractors are preferably of the type which lock in response to abrupt acceleration or deceleration of the vehicle in any horizontal direction. They may also be of the type in which locking is responsive to abrupt pull out of the associated shoulder belts. Nevertheless, regardless of which type of inertia retractor is used, the shoulder belt retractors 46 pull the shoulder belts upwardly and rearwardly across the user's chest while the lap belt retractors 36 pull the lap belts 34 across the user's lap.

The shoulder belts 40 extend between the roof mounted retractors 46 and the D-rings 38 and pass through guides or stops 50 mounted on the outboard ends of the headrests carried by the seat backs 18. The shoulder belts 40 slide freely in both directions through stops 50 and are thus readily moved against the pull of the retractors 46 to the restraining position shown by restraint belt system 30 as well as being readily retracted to the storage position back through the stops.

The shoulder and lap belts are pulled into their respective retractors for storage only upon detachment of the D-rings 38 from their associated buckles 44. In this storage condition as shown by belt system 32, the interconnected lap and shoulder belts extend generally vertically between the lap belt retractor 36 and the seat back mounted stop 50, and the shoulder belt extends rearwardly and upwardly from stop 50 to the roof mounted shoulder belt retractor 46.

Figure 2:
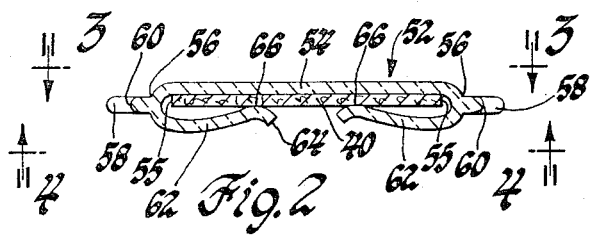
FIG. 2 is an enlarged sectional view through the shoulder belt of one of the belt systems and shows the configuration of a comfort clip utilized on this shoulder belt so as to engage a seat back mounted stop through which the shoulder belt extends so that this engagement prevents the retractor for the shoulder belt from tensioning this belt across a user's chest.
Figure 3:
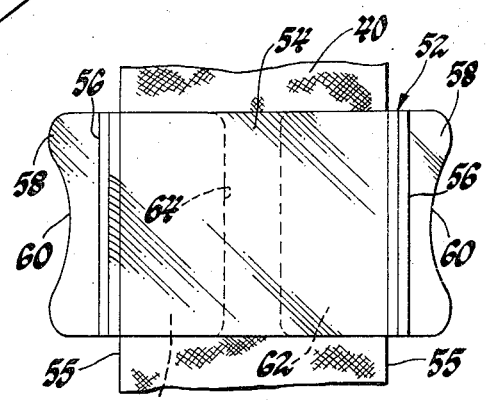
FIGS. 3 and 4 are views of the comfort clip taken in opposite directions respectively along lines 3—3 and 4—4 of FIG. 2 and thus show the clip from different orientations.
Figure 4:
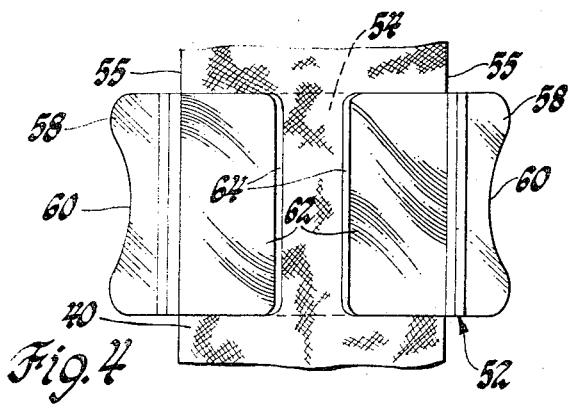

A comfort clip 52 is mounted on each shoulder belt 40 between the associated D-ring 38 and seat back mounted stop 50. FIGS. 2 through 4 show enlarged views of this comfort clip which is of a one-piece plastic construction that includes a generally rectangular base 54 having an elongated configuration. The clip base 54 extends laterally between the opposite edges 55 of the shoulder belt 40 and defines rectilinear configurations at each of its lateral ends 56 adjacent these belt edges 55. A pair of wings 58 integrally project from the ends of the base so as to extend laterally outward with respect to the belt 40 generally within its plane. These wings have inwardly extending depressions 60 that allow the comfort clip to be manually grasped and slid along belt 40 in a manner that will be described later. A pair of clamping portions 62 are also integrally supported by the respective ends of the clip base 54 and extend around the edges of the belt and back toward each other. The clamping portions, when viewed as in FIG. 2, have ogee configurations that terminate short of each other and define a slot 64 which extends longitudinally with respect to the elongated axis of belt 40 as best seen in FIG. 4. The inner ends of the clamping portions 62 define surfaces 66 that oppose the base 54 and have arcuate configurations when viewed as in FIG. 2. These arcuate surfaces extend parallel with respect to the longitudinal axis of belt 40 in a rectilinear manner.

Figure 5:
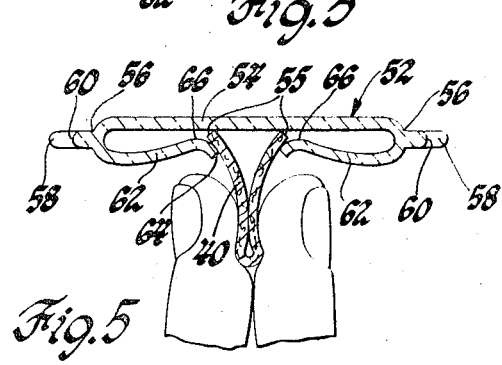
FIG. 5 is a view of the clip taken in a direction similar to FIG. 2 and shows the manner in which the shoulder belt may be inserted to within the clip at a position intermediate the ends of the shoulder belt.

As shown in FIG. 5, an intermediate portion of shoulder belt 40 between its ends may be inserted within clip 52 through the slot 64 between the inner ends of clamping portions 62. The belt is then flattened so as to be clamped within the clip between the base 54 and the arcuate surfaces 66 of the clamping portions in the manner shown by FIG. 2. The clamping force exerted on the shoulder belt 40 by the clip is not too large to prevent the clip from being manually slid along the shoulder belt in a manner that provides adjustment thereof along the belt length. However, the wings 58 of the clip are engageable with the sides of stop 50 to prevent the clip from moving through the stop and the clamping force is sufficiently large to prevent the shoulder belt retractor 46 from pulling the shoulder belt through the clip upon such engagement of the clip with the stop. Thus, the clip 52 may be readily positioned in the location shown by restraint belt system 30 so as to prevent the shoulder belt retractor 46 from tensioning the shoulder belt 40 across the occupant's chest.

The degree of the clamping force the clip exerts on the belt depends on the thickness of the belt, the normal distance between the base 54 and the arcuate surfaces 66 of the clamping portions in an undeflected state, the force required to deflect the clamping portions 62 away from the base 54 a sufficient distance to receive the belt, and the coefficient of friction between the belt and the clip in their clamped condition. This clamping force must be balanced against the pull exerted on the shoulder belt 40 by its inertia retractor 46 in the above-described manner so that the clip 52 functions effectively with the belt system. This relationship of the clamping force of the clip 52 with respect to the belt pull exerted by the inertia retractor 46 thus must be maintained in order for the belt system to be operable in the manner intended.

Preferably, the comfort clip 52 is injection molded from a clear plastic. The injection molding allows an economical clip, and the clear plastic eliminates the necessity of coloring the clips to match with shoulder belts or vehicle interiors of different colors.

It is believed evident that the foregoing description describes an improved automotive vehicle occupant restraint belt system.

What is claimed is:

1. In an automotive vehicle including an occupant seat having cushion and back portions, a restraint belt system for a seated occupant comprising:

lap and shoulder belts with first ends secured to a common first buckle component, a second buckle component for selectively attaching the first buckle component so as to secure the belts in an occupant restraining position, the lap belt extending generally laterally with respect to the vehicle across the occupant's lap while in the restraining position, and the shoulder belt extending diagonally across the occupant's chest while in the restraining position;

an automatic locking type belt retractor receiving the other end of the lap belt so as to normally tension the lap belt across the lap of the belted occupant and to store the lap belt upon detachment of the buckle components;

an inertia locking type belt retractor receiving the other end of the shoulder belt so as to normally tension the shoulder belt across the chest of the belted occupant and to store the shoulder belt upon detachment of the buckle components;

a stop through which the shoulder belt passes, the stop being located toward the shoulder belt retractor with respect to the shoulder of the belted occupant over which the shoulder belt passes while extending diagonally across the occupant's chest in the restraining position, and the stop allowing the shoulder belt to be freely pulled in either direction therethrough so that the shoulder belt is not impeded thereby during movement to the restraining position and does not, in and of itself, prevent the shoulder belt retractor from tensioning the shoulder belt across the occupant's chest; and a plastic comfort clip positioned on the shoulder belt between the first buckle component and the stop, the comfort clip being of a one-piece construction and including a generally planar base of a rectilinear configuration that extends between the opposite edges of the shoulder belt in a generally parallel relationship with respect to the plane of this belt, the ends of the base adjacent each edge of the shoulder belt having generally rectilinear configurations extending generally parallel to the edges of the shoulder belt, and a pair of clamping portions integrally connected to the rectilinear ends of the base adjacent each edge of the shoulder belt and extending about the respective edges of the shoulder belt back toward each other so that the shoulder belt is positioned between the clamping portions and the base of the clip, the clamping portions defining a slot through which the shoulder belt may be inserted intermediate the ends thereof so as to be positioned between the clamping portions and the base, the base and the clamping portions of the clip cooperating to clamp the shoulder belt therebetween with a force that is not so large as to prevent the clip from being readily slid along the shoulder belt by a manual effort to provide adjustment thereof, the clamping force being sufficiently large to prevent the shoulder belt retractor from pulling the shoulder belt through the clip, and the clip engaging the stop to prevent movement therethrough so that appropriate manual adjustment of the clip along the shoulder belt will prevent the shoulder belt retractor from tensioning the shoulder belt across the occupant's chest.

2. In an automotive vehicle including an occupant seat having cushion and back portions, a restraint belt system for a seated occupant comprising:

lap and shoulder belts with first ends secured to a common first buckle component, a second buckle component for selectively attaching the first buckle component so as to secure the belts in an occupant restraining position, the lap belt extending generally laterally with respect to the vehicle across the occupant's lap while in the restraining position, and the shoulder belt extending diagonally across the occupant's chest while in the restraining position;

an automatic locking type belt retractor receiving the other end of the lap belt so as to normally tension the lap belt across the lap of the belted occupant and to store the lap belt upon detachment of the buckle components;

an inertia locking type belt retractor receiving the other end of the shoulder belt so as to normally tension the shoulder belt across the chest of the belted occupant and to store the shoulder belt upon detachment of the buckle components;

a stop through which the shoulder belt passes, the stop being located toward the shoulder belt retractor with respect to the shoulder of the belted occupant over which the shoulder belt passes while extending diagonally across the occupant's chest in the restraining position, and the stop allowing the shoulder belt to be freely pulled in either direction therethrough so that the shoulder belt is not impeded thereby during movement to the restraining position and does not, in and of itself, prevent the shoulder belt retractor from tensioning the shoulder belt across the occupant's chest; and a plastic comfort clip positioned on the shoulder belt between the first buckle component and the stop, the comfort clip being of a one-piece construction and including a generally planar base of a rectilinear configuration that extends between the opposite edges of the shoulder belt in a generally parallel relationship with respect to the plane of this belt, the ends of the base adjacent each edge of the shoulder belt having generally rectilinear configurations extending generally parallel to the edges of the shoulder belt, a pair of wings integrally projecting from the rectilinear ends of the base and extending laterally outward with respect to the opposite edges of the shoulder belt, the wings engaging the stop to prevent movement of the clip through the stop and having inwardly extending depressions where the clip can be manually grasped to provide adjustment thereof along the shoulder belt, and a pair of clamping portions integrally connected to the rectilinear ends of the base adjacent each edge of the shoulder belt and extending about the respective edges of the shoulder belt back toward each other with ogee configurations that terminate short of each other so as to define a slot, the slot allowing the shoulder belt to be inserted within the clip at a location intermediate the ends thereof so as to be positioned between the clamping portions and the base, the base and the clamping portions of the clip cooperating to clamp the shoulder belt therebetween with a force that is not so large as to prevent the clip from being readily slid along the shoulder belt by a manual force applied to the wings of the clip so as to provide adjustment of the clip position along the length of the shoulder belt, and the clamping force being sufficiently large to prevent the shoulder belt retractor from pulling the shoulder belt through the clip so that appropriate manual adjustment of the clip along the shoulder belt will allow the wings of the clip to engage the stop and prevent the shoulder belt retractor from tensioning the shoulder belt across the occupant's chest while in the restraining position.

* * * * *